United States Patent
Tweet (10) Patent No.: US 7,481,198 B2
(45) Date of Patent: Jan. 27, 2009

(54) THROTTLE BODY AND PLATE

(75) Inventor: Ole Tweet, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 11/692,747

(22) Filed: Mar. 28, 2007

(65) Prior Publication Data

US 2007/0163539 A1  Jul. 19, 2007

Related U.S. Application Data

(62) Division of application No. 11/106,941, filed on Apr. 15, 2005, now Pat. No. 7,213,568.

(51) Int. Cl.
*F02D 9/08* (2006.01)
*B21K 3/00* (2006.01)
*F16K 1/22* (2006.01)

(52) U.S. Cl. .................. 123/337; 29/888.01; 251/305

(58) Field of Classification Search ............... 123/337; 251/305; 29/888.01; 285/148.22, 328, 331
See application file for complete search history.

(56) References Cited

U.S. PATENT DOCUMENTS

| | | | |
|---|---|---|---|
| 2,271,390 A | 1/1942 | Dodson | |
| 3,485,476 A | 12/1969 | Hemphill | |
| 3,750,698 A | 8/1973 | Walchle et al. | |
| 3,921,955 A | 11/1975 | Haddad, Jr. | |
| 4,783,052 A | 11/1988 | Walden | |
| 4,786,031 A | 11/1988 | Waldrop | |
| 5,165,727 A * | 11/1992 | Valley | 285/12 |
| 5,181,492 A | 1/1993 | Sausner et al. | |
| 5,257,772 A | 11/1993 | Habicht | |
| 5,370,148 A * | 12/1994 | Shafer | 285/12 |
| 5,375,887 A * | 12/1994 | Johnson | 285/12 |
| 5,386,145 A | 1/1995 | Boswell | |
| 5,662,077 A | 9/1997 | Boswell | |
| 5,718,202 A | 2/1998 | Bentz et al. | |
| D402,013 S * | 12/1998 | Saffrey | D23/263 |
| 6,016,655 A | 1/2000 | Boswell | |
| 6,119,652 A | 9/2000 | Waples et al. | |
| 6,149,140 A | 11/2000 | Boswell | |
| 6,439,294 B1 | 8/2002 | Boswell | |
| 7,128,038 B2 * | 10/2006 | Kawai et al. | 123/184.21 |
| 2007/0013187 A1 * | 1/2007 | Petner et al. | 285/148.22 |

FOREIGN PATENT DOCUMENTS

JP  402209676  8/1990

* cited by examiner

*Primary Examiner*—Hai H Huynh
(74) *Attorney, Agent, or Firm*—Black, Lowe & Graham PLLC (57) ABSTRACT

A throttle valve assembly is held within a passageway in a throttle body. The assembly includes a plate and a pivot shaft. The pivot shaft extends through the mounting receptacle and engages with the throttle body. A method of making a series of throttle bodies includes molding multiple like bodies having first and second passageway portions. The first portions are sized to receive butterfly valves of a standard size. The second portions, positioned downstream from the first portions, have cross sectional openings equal to or smaller than the first portions. The second portions are machined or molded to various sizes adapted to flow fluid into the in-take ports of various size engines.

19 Claims, 8 Drawing Sheets

THROTTLE BODY AND PLATE

PRIORITY CLAIM

This application is a divisional of U.S. application Ser. No. 11/106,941, filed Apr. 15, 2005.

FIELD OF THE INVENTION

This invention relates generally to valve members for fluid flow systems and, more specifically, to air intake systems for internal combustion engines.

BACKGROUND OF THE INVENTION

A throttle plate for a throttle body or carburetor is conventionally constructed with a flat metal plate pivotally held in place with a pivot shaft. The shaft holds the plate within the throttle bore for control of air intake for mixing with fuel and burning after being compressed within the engine cylinder. The ends of the shaft are secured to, and extend through, the carburetor or throttle body. One end is coupled to the throttle controller to vary the opening of the throttle plate to increase or decrease the amount of air fed to the intake port of the cylinder.

As air passes over the throttle plate the flow is somewhat interrupted by the discontinuity introduced by the bulging shaft extending across the middle of the plate. A conventional shaft holding a throttle plate is "D" shaped and riveted or screwed to the throttle plate. Smooth air flow is disrupted with a consequent loss in total air flow possible at wide-open throttle (WOT) for a given throttle body size. Thus, a need exists for a smoother flowing, more efficient air intake system.

In the case of fuel delivery systems, a specific throttle body is sized for the needs of a particular engine's fuel requirements. For an engine of a different displacement, a differently sized throttle body is provided. The need for various sizes results in increased part counts for a series of engines with resultant increases in cost and complexity. Furthermore, carburetors, throttle bodies, and throttle plates are typically constructed of metals such as aluminum, brass, and steel. These materials add weight to a vehicle and also result in costly part construction and assembly. The shaft and rivet or screw assembly also introduces an unnecessary chance for failure.

SUMMARY OF THE INVENTION

The present invention improves throttle valve flow, decreases weight, improves durability, and reduces manufacturing costs for throttle bodies and carburetors.

The present invention provides numerous advantages through its throttle valve assembly for engagement with a throttle body. The throttle valve assembly is held within a passageway in the throttle body. The assembly includes a plate and a pivot shaft. The plate includes a contoured front surface, a contoured back surface, and a mounting receptacle. The mounting receptacle forms a smooth bulge at the side of the plate. At least one of the front and back surfaces is smoothly contoured to the bulge. The pivot shaft is mounted to the mounting receptacle and engageable with the throttle body. Preferably, both the front and back surfaces are smoothly contoured to the bulge to provide increased aerodynamics and efficiency of flow especially at wide open throttle.

In one preferred aspect of the invention, the plate is a molded butterfly valve. The plate includes a center aperture to receive the pivot shaft. The shaft is indexed to the aperture. At least a portion of the shaft has a D-shaped cross section for indexing with the aperture. Alternatively, other non-slip shapes are used. Possible examples include T-shapes, x-shapes, or keyed shafts. In one preferred aspect, the mounting receptacle forms bulges on both sides of the plate with the pivot shaft extending through both bulges to engage the throttle body.

The invention may also be defined as a throttle valve assembly including a throttle body, a plate, and a pivot shaft. The throttle body includes a passageway. The plate has a first face, a second face, and a peripheral edge. The plate includes a mounting receptacle at a portion of the peripheral edge. The receptacle is thicker than most of the peripheral edge, the first and second face being contoured for a smooth transition to the receptacle. The pivot shaft is mounted to the mounting receptacle. The pivot shaft extends to a mount with the throttle body to allow pivotal movement of the plate within the passageway.

In further preferred aspects of the invention, the plate is formed of molded thermoplastic material or die cast metal. The throttle body may also comprise a molded thermoplastic material or a metal.

In still a further preferred aspect of the invention, the throttle body passageway includes a valve portion and a second passageway portion. The plate is mounted within the valve portion. The second passageway portion is downstream of the valve portion and provides an equal-to or smaller flow channel for communication of fluid flow to an engine in-take port having a similar opening size. In the preferred embodiment, the second passageway portion is machined after molding such that it is sized to the in-take port of the engine. Alternatively, the second passageway portions may be molded with differing pin sizes to match various intake port sizes. The passageway is preferably a bore, circular in cross section. In one preferred embodiment, the throttle body is part of a carbureted fuel delivery system. In another preferred embodiment, the throttle body is part of a fuel injection fuel delivery system.

A method of making a series of throttle bodies for various internal combustion engine sizes is also part of the present invention. The method includes molding multiple like bodies having passageways including first portions and second portions. The first portions are sized to receive butterfly valves of a standard size. The second portions may have various cross sectional areas (equal to or smaller) and are positioned downstream from the first portions. The second portions are machined or molded to various sizes adapted to flow fluid into the in-take ports of various size engines.

The method further includes molding and inserting butterfly valves within the first portions. The butterfly valves are molded with front and back faces and mounting receptacles. The mounting receptacles are smoothly contoured with the faces.

A further preferred method of carrying out the invention for making throttle bodies with various internal combustion engine sizes includes providing a mold with a standard outer shape and a passageway first portion. A first pin is placed within the mold to form a passageway second portion size to fit a particular first engine. The first throttle body is molded with a flowable material and the part is removed. A second pin is then placed within the mold to form a passageway second portion sized to fit a particular second engine. A second throttle body is then molded with a flowable material and the part is removed. Thus, with a single standard mold, throttle bodies of various sizes for various engine sizes can be created. Preferably, the flowable material includes a thermoplastic material or a metal, formed for example by die casting. The first and second portions of the passageway are preferably co-axial.

In a further preferred aspect of the method, a first-size plate valve is placed within the first portion of the passageway of the throttle body that is molded for the first engine. A first-size plate valve is also placed within the first portion of the passageway of the throttle body molded for the second engine. Thus, part counts are reduced, assembly is simplified, and costs are decreased.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1A:
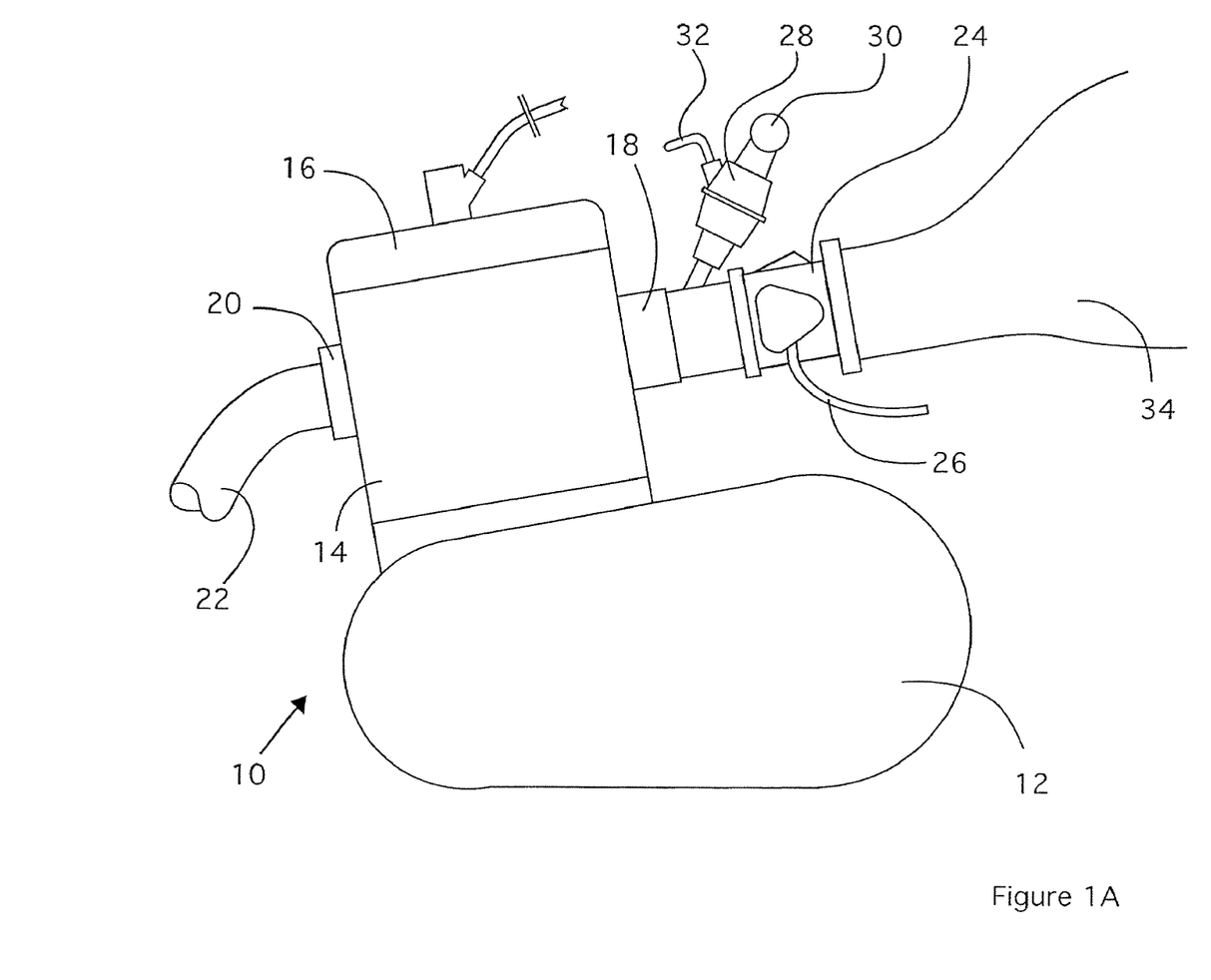
FIG. 1A is a side-elevational view of the throttle body of the present invention coupled to an engine.
Figure 1B:
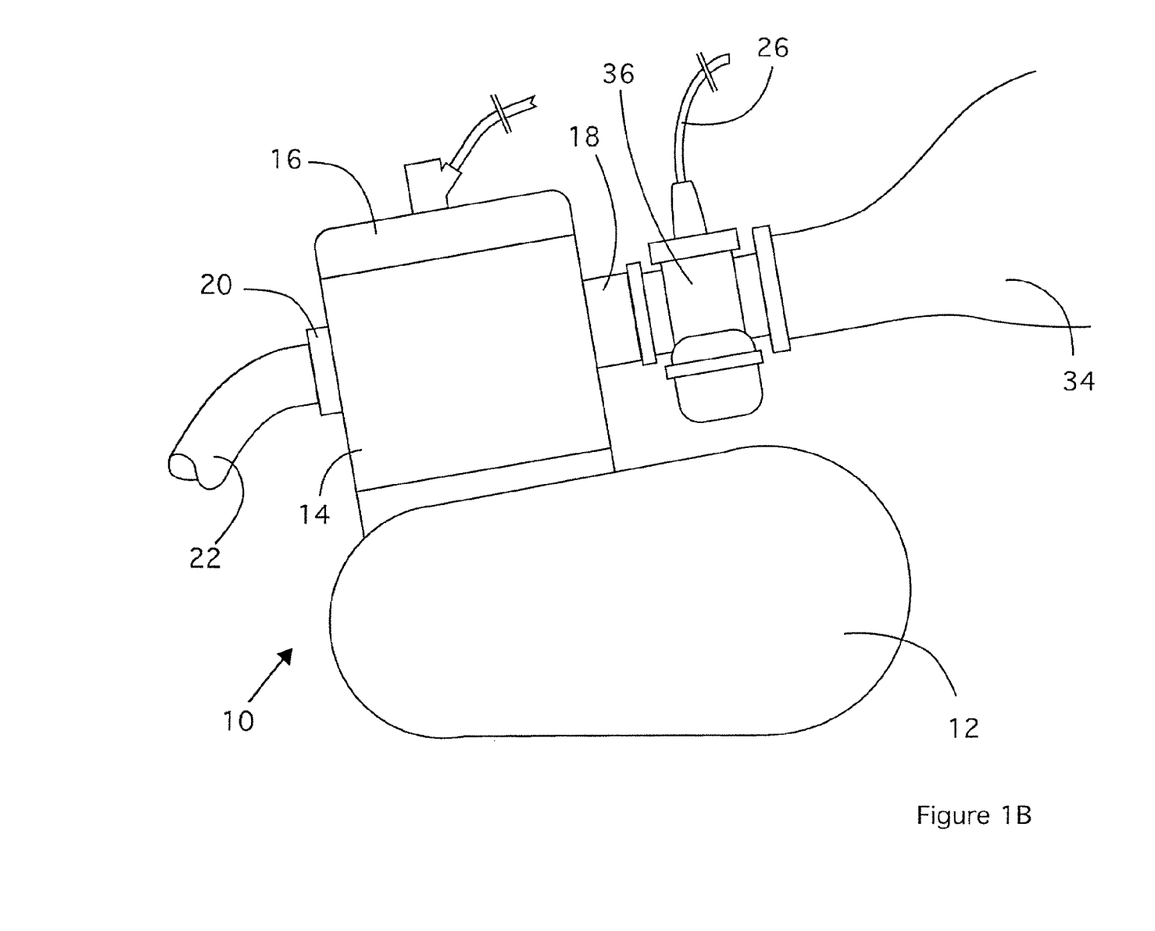
FIG. 1B is a carburetor with an internal throttle plate of the present invention coupled to an engine.

Referring first to FIGS. 1A and 1B, an engine 10 is provided for powering a machine, such as an all-terrain vehicle. The present invention is directed toward the fuel delivery system for engine 10. Engine 10 used as an example herein has a basic configuration, including a crank case 12 and a cylinder 14 with a head 16. The fuel delivery system of the present invention may be adapted to work with any internal combustion engine, for any motorized purpose. The advantages of more efficient fuel delivery and simpler, less expensive components may all be realized in such situations.

Engine 10 includes an inlet port 18 to feed a fuel-air mixture into cylinder 14. An exhaust port 20 is also provided for exhaust gases to be channeled to an exhaust pipe 22. Exhaust pipe 22 then optionally runs to a muffler or other exhaust treatment devices. The inlets and exhaust ports are all of standard configuration or may be of any necessary configuration. For example, in a two-stroke engine, the inlet ports may vary from that in a four-stroke engine.

The fuel mixing and delivery system, whether it be a fuel injection system or a carbureted system is coupled to inlet port 18. Thus, for example, in FIG. 1A, a throttle body 24 is provided. Throttle body 24 includes a throttle cable 26 for control of a throttle valve within throttle body 24, as will be described in more detail below. A fuel injector 28 is also positioned downstream of throttle body 24. Fuel injector 28 may alternatively inject fuel into throttle body 24 rather than downstream of throttle body 24. Fuel injector 28 includes a fuel line 30 and a control line 32. Fuel line 30 provides fuel supply to fuel injector 28. Control line 32 preferably comprises wires for electrically controlling the operation of fuel injector 28. Finally, an air hose 34 is connected to the upstream end of throttle body 24. Air hose 32 extends, for example, from an air cleaner. Air hose 34 provides air to throttle body 24 for control by throttle body 24.

Turning to FIG. 1B, a carbureted arrangement is illustrated. In place of a fuel injector 28 and a throttle body 24, a carburetor 36 is provided. Carburetor 36 includes a throttle valve therein for control of the air that is fed to engine 10.

Figure 2A:
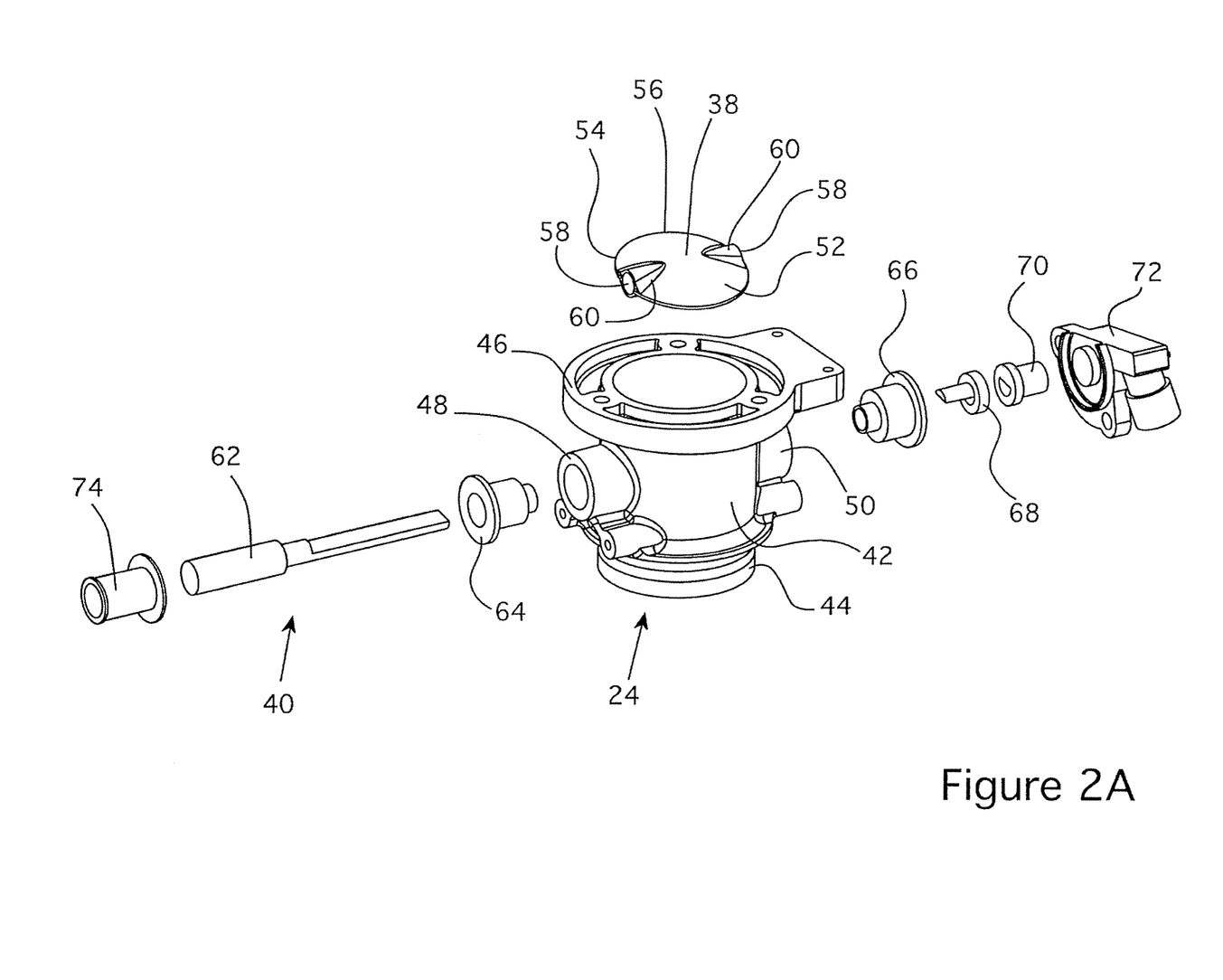
FIG. 2A is an exploded isometric view of the throttle body of the present invention with the rod and throttle plate assembly.

Referring now to FIG. 2A, the details of throttle body 24, a throttle plate 38, and a rod assembly 40 will now be described. Throttle body 24 includes a central housing 42 of generally cylindrical configuration. An outlet mount 44 is disposed on the downstream end of central housing 42 and is configured for coupling to a hose or inlet port to feed a fuel-air mixture to cylinder 14 of engine 10. Thus, outlet mount 44 may include a recess circumferentially within an outer portion thereof for receiving a clamp for securing a hose to lead to inlet port 18 of cylinder 14.

An inlet mount 46 extends from the upstream end of central housing 42. Inlet mount 46 includes an outward flange extending from central housing 42 to provide a surface for coupling air hose 34. Alternatively, the outward flange is omitted and the airhose is clamped to inlet mount 46. Inlet mount 46 also includes a flange member for securing a throttle position sensor as will be described below. Central housing 42 further includes a left rod sleeve 48 and a right rod sleeve 50 projecting outwardly on opposite sides thereof. Right and left rod sleeves 48 and 50 preferably have a common center axis and are somewhat cylindrical in shape to hold rod assembly 40 therein for control of throttle plate 38.

Throttle plate 38 includes a front face 52, a rear face 54, and a peripheral edge 56 extending circumferentially around throttle plate 38. Front and rear faces 52 and 54 bulge outwardly towards their middles and are gradually reduced in section as they approach peripheral edge 56. However, plate receptacles 58 are provided on diametrically opposed sides at the peripheral edge 56 in order to accommodate rod assembly 40. Contoured bulges 60 are provided in both front face 52 and rear face 54 of throttle plate 38 for smooth air flow over throttle plate 38. In prior-art systems, a pivot rod was simply attached to a flat face of a throttle plate creating turbulent flow and thus decreasing the efficiency of the throttle plate in the system. In contrast, the present invention provides convex faces with contoured side bulges 60 for smooth flow over and around throttle plate 38 while providing a secure connection to a pivot rod completely through one side and out the other of throttle plate 38. Even if the control rod or other device does not extend completely through the throttle plate, in an alternate embodiment, wherever such rod or control device is connected, may have an appropriate smooth contour for a smooth air flow. Preferably, throttle plate 38 is constructed of injection molded plastic material making it easy and inexpensive to manufacture in such contours and shapes as described above and as illustrated in the figures. Alternatively, throttle plate 38 may be machined, cast, or otherwise formed. It may alternatively be formed from metal rather than plastic. Other materials may alternatively be used.

Rod assembly 40 includes a pivot rod 62 that extends through left and right bushings 64 and 66 that are held within left and right rod sleeves 48 and 50. Pivot rod 62 includes a cylindrical portion at one end and a D-shaped portion at the other end for proper engagement with the various elements of rod assembly 40. Other shapes that resist rotation may alternatively be used as long as they resist bending and slipping relative to the parts to which they are coupled. The D-shaped end extends through throttle body 24 after passing through left bushing 64. Left bushing 64 is generally cylindrical in shape with a smaller cylindrical projection on an inward end and a flange on the outer end. Right bushing 66 is similarly shaped. The outer flanges abut against the ends of rod sleeves 48 and 50 while the cylindrical portions fit within throttle body 24. Bushings 64 and 66 properly position entire rod assembly 40 along the proper axis for turning of throttle plate 38 within central housing 42 of throttle body 24. A D-plug 68 is provided to be secured over the D-shaped end of pivot rod 62 for mating engagement therewith within right bushing 66. A D-receiver 70 abuts against D-plug 68 to also receive a further-most end of the D-shaped portion of pivot rod 62. D-receiver 70 abuts against throttle position sensor 72. Throttle position sensor 72 provides feedback as to the angular position of throttle plate 38 based on the position of pivot rod 62. The cylindrical body of right bushing 66 is somewhat larger then that of left bushing 64 so as to contain the outer flange portions of D-plug 68 and D-receiver 70.

The opposite end of pivot rod 62, which is cylindrical in shape, receives a left end mount 74. Left end mount 74 is generally cylindrical in shape with a flange at the inner end to abut the flange of left bushing 64. Left end mount 74 is force-fit or otherwise positively secured to the cylindrical end of pivot rod 62. Left end mount 74 preferably receives a spring and a control mechanism such that it is used to turn pivot rod 62 to control the angular position of throttle plate 38 within throttle body 24.

All of the parts of rod assembly 40 are constructed of plastic materials in the preferred embodiment. Alternatively, other materials may be used for these individual components.

Figure 2B:
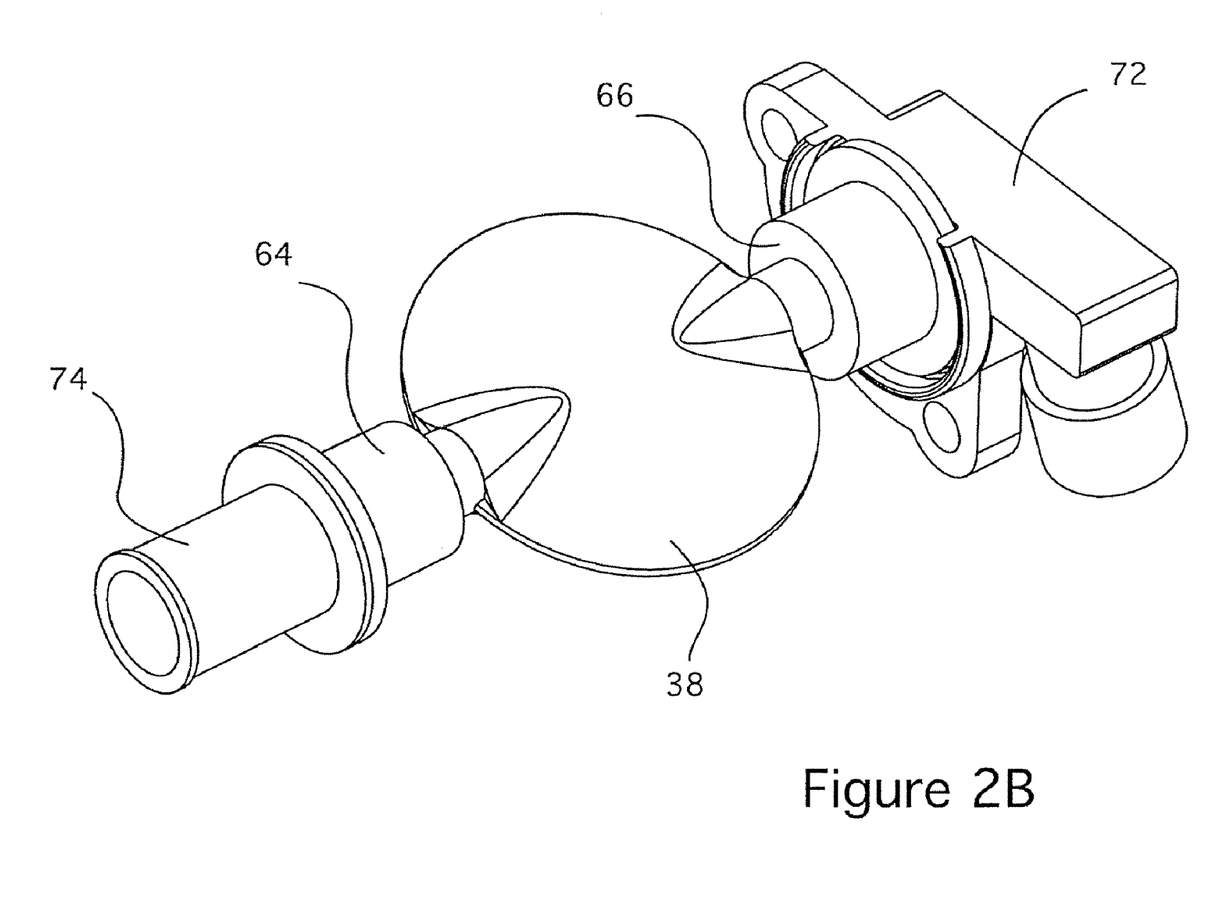
FIG. 2B is an isometric view of the throttle plate assembly in an assembled configuration.

FIG. 2B illustrates the assembled configuration of rod assembly 40 with throttle plate 38 and throttle body 24 completely removed. Thus, the completed coupling of these elements together is shown. Also, the smooth contours of throttle plate 38 are evident from this view. The abutment of the flanges of left bushing 64 and left end mount 74 are also illustrated. Note also that D-plug 68 and D-receiver 70 (not shown in FIG. 2B) are completely contained within right bushing 66 and throttle plate 38. Throttle position sensor 72 is configured for attachment to the flange extending from the side of inlet mount 46 as illustrated in FIGS. 3A and 3B.

Figure 3A:
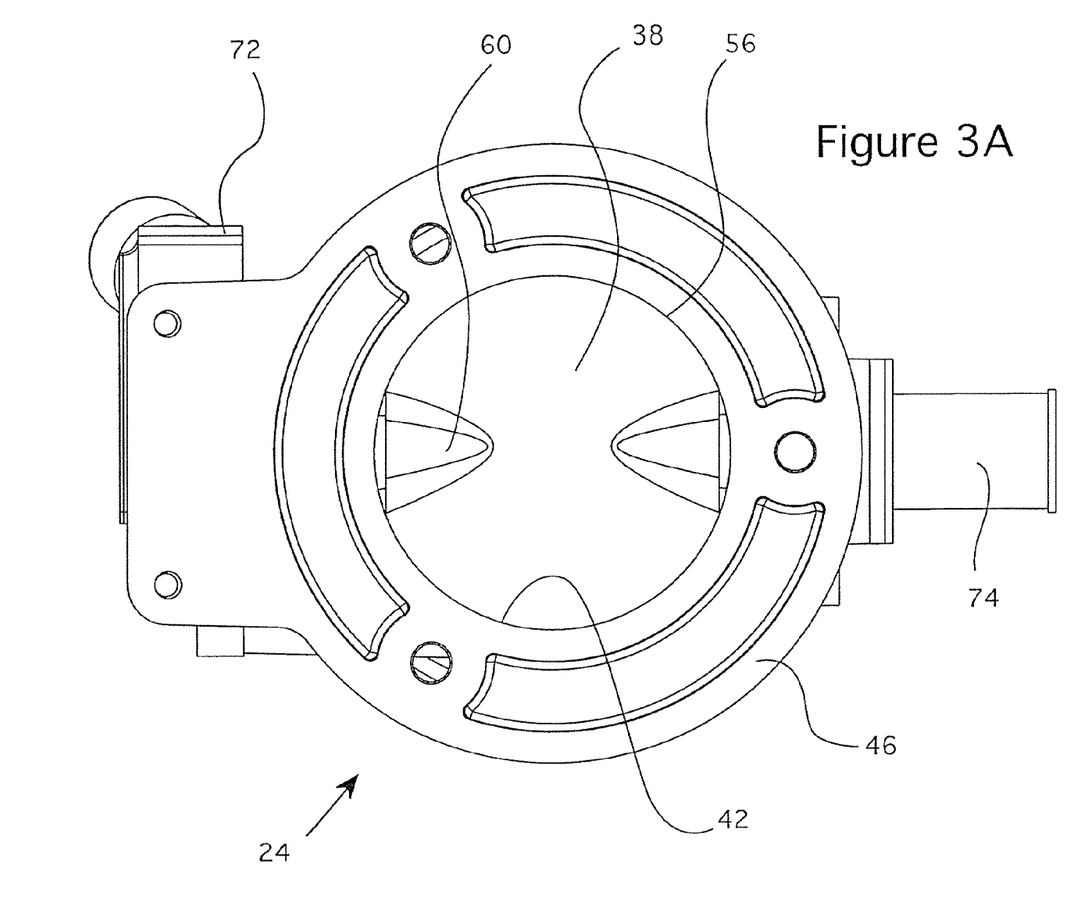
FIG. 3A is a side-elevational end view of the throttle body with the throttle plate in a closed position.

Turning to FIG. 3A, this view shows throttle plate 38 in a closed configuration substantially cutting off the air fed to the cyclinder. Note that the peripheral edge 56 of throttle plate 38 is configured to be adjacent the inner diameter of central housing 42 of throttle body 24.

Figure 3B:
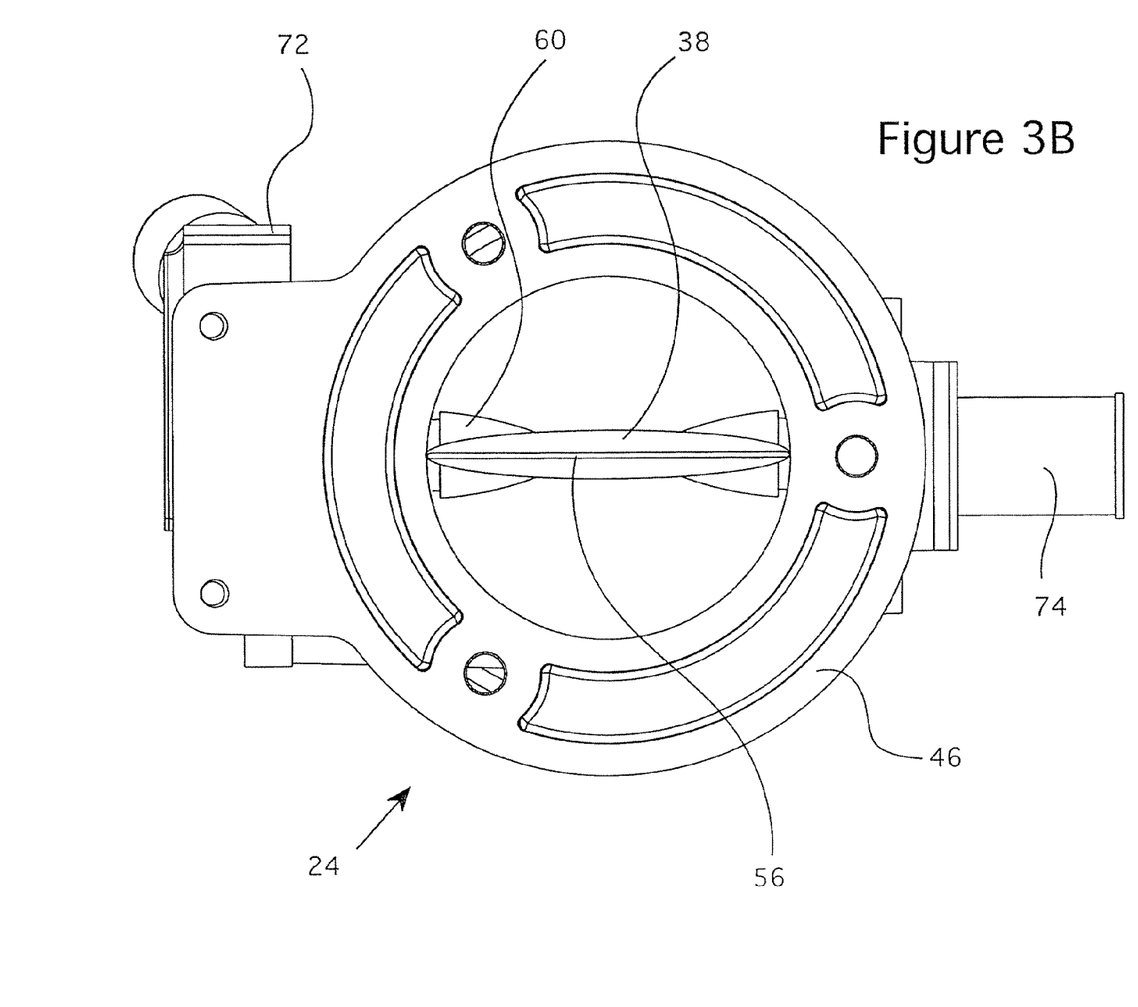
FIG. 3B is a side-elevational end view of the throttle body with the throttle plate in a wide open throttle position.

FIG. 3B illustrates the smooth flow path that is provided when throttle plate 38 is positioned in a wide open throttle position. Note that the contouring of throttle plate 38 provides initially a relatively sharp peripheral edge 56 then followed by smooth flow path around throttle plate 38 including around the sides where pivot rod 62 (not shown in FIG. 3B) extends into and out of throttle plate 38. Such contouring results in efficiency of air flow through throttle body 24. A preliminary test on some embodiments have indicated at least a 5% improvement in air flow with this contoured throttle plate.

Figure 4:
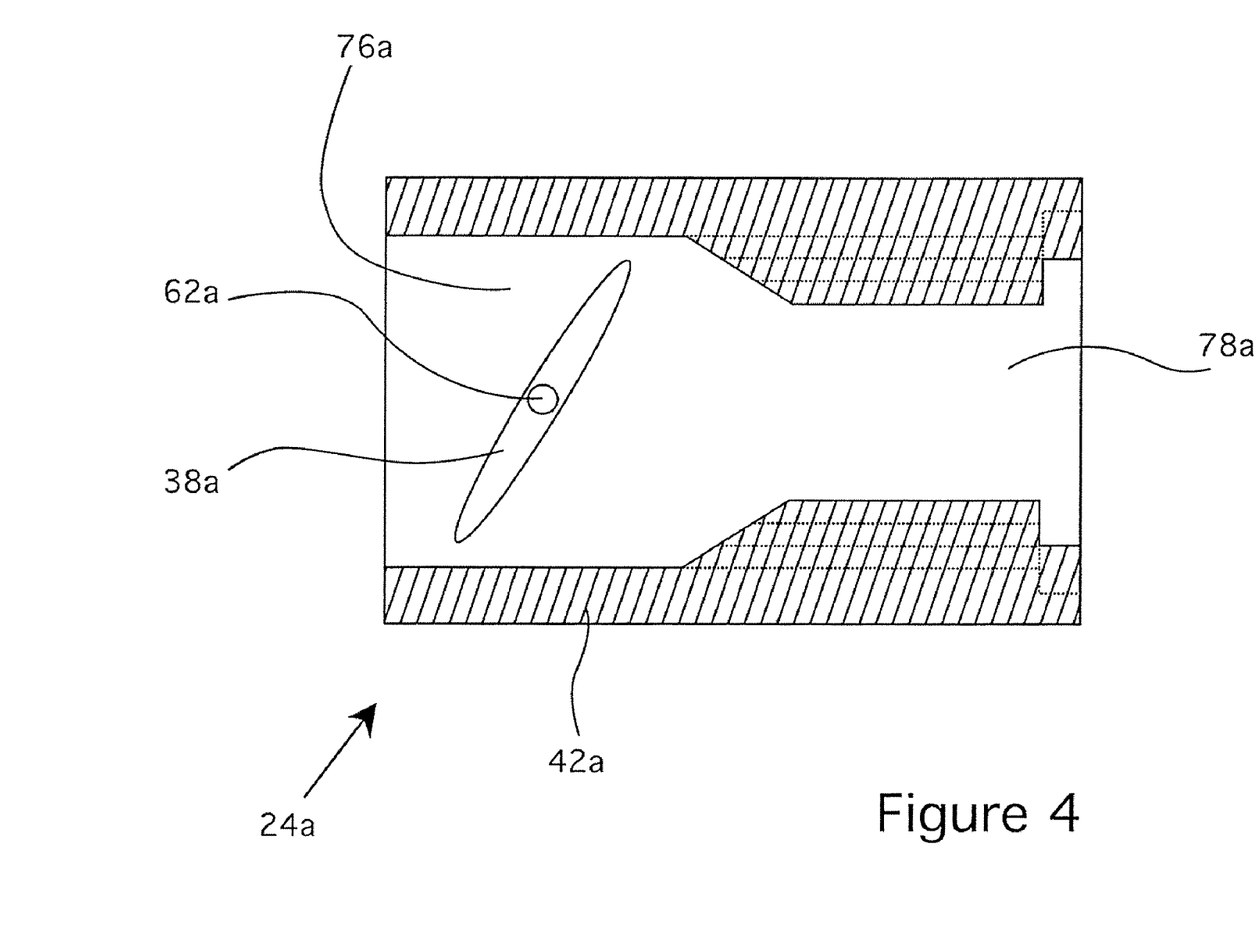
FIG. 4 is a cross-sectional view of an alternative throttle body with a reduced passage portion.

FIG. 4 illustrates a throttle body 24a that may be used with a family of engine sizes. Throttle body 24a includes a central housing 42a and is arranged to receive a throttle plate 38a with a pivot rod 62a therein. Throttle plate 38a is received within a valve passage 76a. This valve passage 76a has a large internal diameter. In the preferred embodiment this diameter is constant throughout a family of throttle bodies used for various engines or engine sizes. However, a reduced passage 78a is provided that may be adapted to different engine sizes or different inlet port sizes. Note the dashed lines that indicate an alternative formed shape of passage 78a. Thus passage 78a is preferably reduced, but may alternatively have a diameter equal to or even slightly larger than the valve passage 76a. Reduced passage 78a is initially molded or otherwise formed, such as by boring, to a particular minimum size that is used on the smallest engine size in a series. Before assembly, reduced passage 78a may be bored or otherwise formed in a larger size to accommodate the larger engine size. Thus, parts and moldings are constant and reduce costs and part counts. The reduced passage 78a is modified depending on the engine size after initial forming to an initial standard size.

Figure 5:
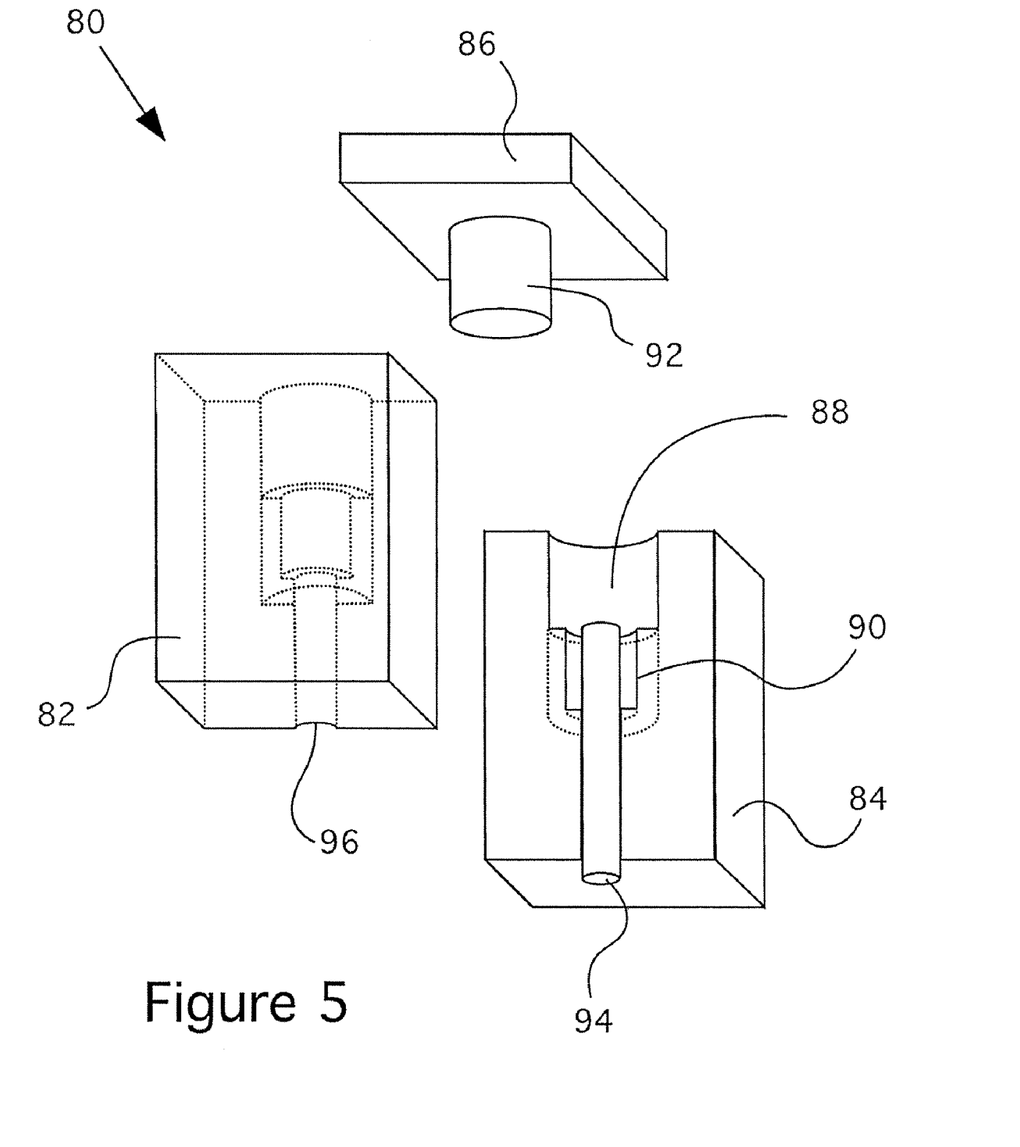
FIG. 5 is an isometric view of a mold for forming a throttle body housing with a reduced housing portion.

Turning now to FIG. 5, the method of molding as well as a mold for creating a throttle body will now be discussed. A mold 80 is provided and includes a left side 82, a right side 84, and a top 86. These pieces are shown separated in FIG. 5. When placed together, they may be used for an injection mold or a pour molding operation to create a throttle body such as that discussed above. Left and right sides 82 and 84 include half each of a valve housing portion 88 and a reduced housing portion 90. Both halves also include a pin opening 96 to receive a pin 94. Valve housing portion 88 is a larger diameter portion that is used to create the housing portion to hold the plate valve therein. A plug 92 extends downwardly from top 86 to fit within valve housing portion 88 to create the inner walls of this cylindrical portion. Pin 94 is inserted within pin opening 96 and extends upwardly to meet the bottom of plug 92 to create the inner diameter of the cylindrical reduced housing portion 90.

Thus, a finished product will be a stepped cylindrical body that includes a larger inner diameter portion at one end. Various size pins may be used that have different diameters at the upper end thereof to create different reduced housing portion inner diameters for various engine sizes. Plug 92 may also be used with different sizes. However, in the preferred embodiment, plug 92 maintains the same size such that the same plate valve may be used from one throttle body to the next. Thus, sizing the throttle body for various engine sizes is accomplished by placing a different size pin 94 within mold 80. Thus, only a single set of molds need be cut and used with various pin sizes. The lower portion of pin 94 may maintain its outer diameter so as to fit tightly within pin-opening 96.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making a throttle body with a modular fluid communication port for various sizes of internal combustion engines, the throttle body operable to control fluid flow to an intake port of the internal combustion engines, the method comprising:

molding a valve housing portion having an inner diameter sized to receive a butterfly valve therein;

selecting a cylindrical tooling device with a desired outer diameter sized to correspond to a fluid flow diameter of an intake port of a desired internal combustion engine; and forming an inlet housing portion located adjacent to the valve housing portion by inserting the cylindrical tooling device to form an inner diameter of the inlet housing portion, wherein the inner diameter of the inlet housing portion is less than the inner diameter of the valve housing portion.

2. The method of claim 1, wherein the inner diameter of the inlet housing portion and the inner diameter of the valve housing portion are co-axial.

3. The method of claim 2, wherein the valve housing portion and the inlet housing portion are molded from at least one of a die cast material and a thermoplastic material.

4. The method of claim 1, wherein forming the inlet housing portion located adjacent to the valve housing portion includes forming the inner diameter of the inlet housing portion to be less than the inner diameter of the valve housing portion.

5. The method of claim 1, wherein forming the inlet housing portion located adjacent to the valve housing portion includes forming the inner diameter of the inlet housing portion to be equal to the inner diameter of the valve housing portion.

6. The method of claim 1, wherein forming the inlet housing portion located adjacent to the valve housing portion includes forming the inner diameter of the inlet housing portion to be greater than the inner diameter of the valve housing portion.

7. The method of claim 1, wherein selecting the cylindrical tooling device with a desired outer diameter includes selecting a cylindrically shaped pin.

8. The method of claim 1, wherein molding the valve housing portion includes inserting a plug device into cooperating mold halves that have received a throttle body molding material.

9. The method of claim 8, wherein inserting the plug device includes inserting a plug device having an outer diameter that is greater than the outer diameter of the cylindrical tooling device.

10. A method of making a series of throttle bodies for various internal combustion engine sizes comprising:
   a. providing a mold with a standard outer shape and a passageway first portion to form the throttle bodies;
   b. placing a first pin within said mold to form a passageway second portion sized to fit a particular first engine;
   c. molding a first throttle body with a flowable material;
   d. removing the throttle body from the mold;
   e. placing a second pin within the mold to form a passageway second portion sized to fit a particular second engine;
   f. molding a second throttle body with a flowable material; and
   g. removing the second throttle body from the mold.

11. The method of claim 10, wherein said flowable material comprises at least one of a die cast material and a thermoplastic material.

12. The method of claim 11, further comprising placing a first-sized plate valve within the first portion of the passageway of the throttle body molded for the second engine.

13. The method of claim 10, wherein said first and second portions of said passageway are co-axial.

14. The method of claim 10, further comprising placing a first-sized plate valve within the first portion of the passageway of the throttle body molded for the first engine.

15. A method of making a throttle body with a modular fluid communication port for various sizes of internal combustion engines, the method comprising:
   selecting a first cylindrical tooling device having a first outer diameter;
   pouring a throttle body molding material into a mold;
   inserting the first cylindrical tooling device into the mold to form an inner diameter surface of a valve housing portion of the throttle body;
   selecting a second cylindrical tooling device having a second outer diameter; and
   inserting the second cylindrical tooling device into the mold to form an inner diameter surface for an inlet housing portion of the throttle body, wherein inserting the second cylindrical tooling device includes contacting an end surface of the second cylindrical tooling device with an end surface of the first cylindrical tooling device.

16. The method of claim 15, wherein selecting the second outer diameter includes selecting the second outer diameter to correspond to a flow diameter of an intake port of a desired internal combustion engine.

17. The method of claim 15, wherein selecting the second outer diameter includes selecting the second outer diameter to be less than the outer diameter of the first cylindrical tooling device.

18. The method of claim 15, wherein selecting the second cylindrical tooling device includes using a different sized second outer diameter without changing the mold.

19. The method of claim 15, further comprising machining the inner diameter surface of the inlet housing portion to increase the inner diameter thereof.

* * * * *